May 6, 1958      J. C. TOBIAS      2,833,608
TABLE FOR ATTACHMENT TO AN AUTOMOBILE BUMPER
Filed Sept. 14, 1956
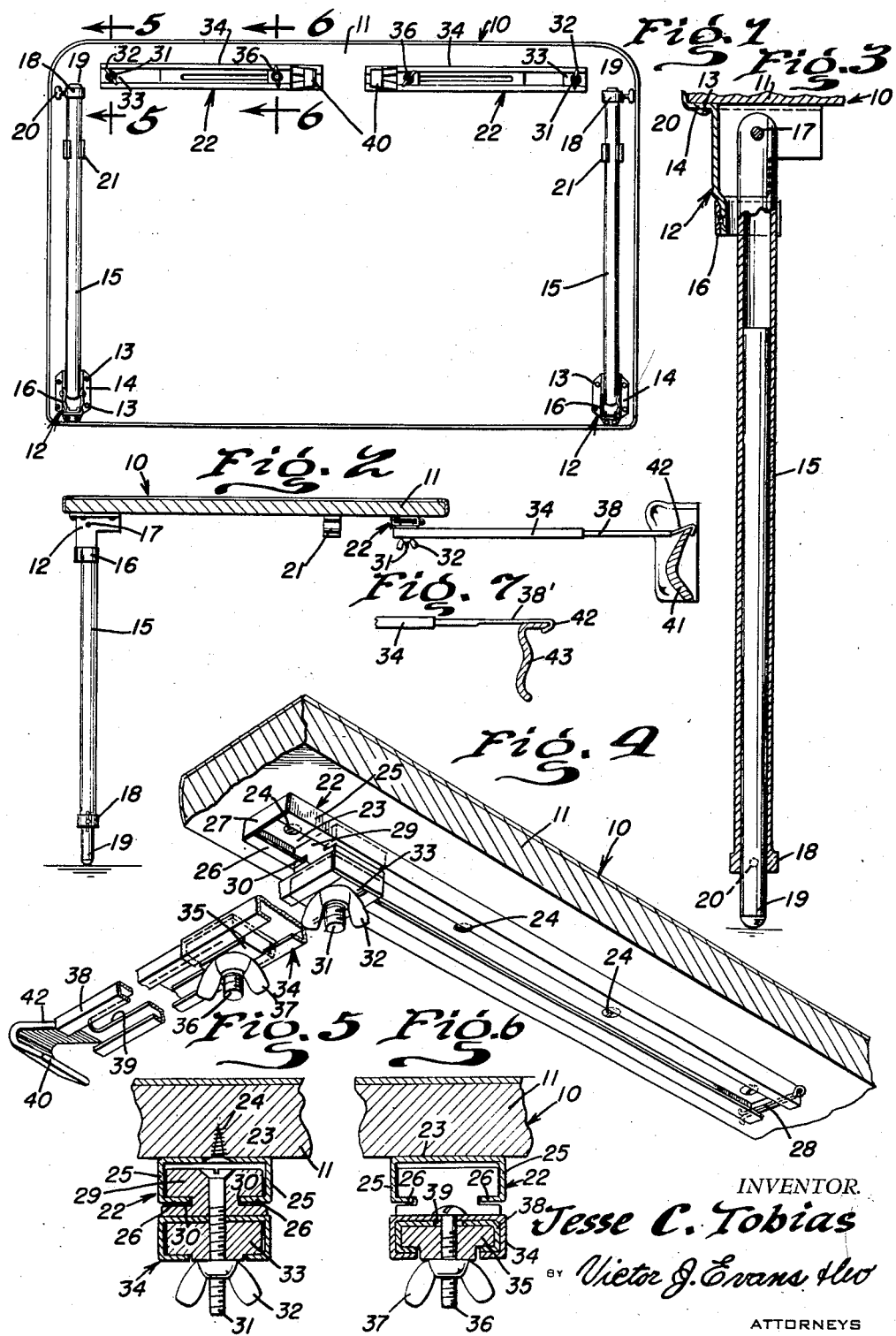
INVENTOR.
Jesse C. Tobias
BY Victor J. Evans &co
ATTORNEYS

United States Patent Office 2,833,608
Patented May 6, 1958

2,833,608

TABLE FOR ATTACHMENT TO AN AUTOMOBILE BUMPER

Jesse C. Tobias, Harrisburg, Pa.

Application September 14, 1956, Serial No. 609,830

3 Claims. (Cl. 311—17)

This invention relates to a table, and more particularly to a table for attachment to a bumper of a vehicle.

The object of the invention is to provide a table which is adapted to be attached to the bumper of a vehicle so that persons can readily use the table for any desired purpose.

Another object of the invention is to provide a table which can be folded so as to occupy a minimum amount of space when it is not being used, and wherein the table can be readily moved to extended or open position when it is being used, the table including hooks which are adapted to engage a bumper of the vehicle, there being adjustable legs for supporting the table.

A further object of the invention is to provide a table which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a bottom plan view of the table showing the parts in folded position.

Figure 2 is a vertical sectional view showing the table attached to a bumper and showing the table in extended or open position.

Figure 3 is a vertical sectional view showing a portion of the table and illustrating one of the legs thereof.

Figure 4 is a fragmentary perspective view illustrating certain constructional details of the apparatus, and with parts broken way and in section.

Figure 5 is a sectional view taken on the line 5—5 of Figure 1.

Figure 6 is a sectional view taken on the line 6—6 of Figure 1.

Figure 7 is a fragmentary sectional view illustrating a modification.

Referring in detail to the drawings, the numeral 10 indicates a table which includes a top or base 11. Secured to the undersurface of the top 11 is a pair of spaced apart support members 12. The support members 12 include flanges 14 which are secured to the top 11 through the medium of suitable securing elements such as screws 13, Figure 1. A pair of legs 15 are pivotally connected to the pair of support members 12 through the medium of pivot pins 17. Connected to each of the support members 12 is a spring clip 16, and the spring clips 16 are adapted to receive the legs 15 when the legs are in open or vertical position as shown in Figure 2 whereby the spring clips 16 will retain the legs 15 in their vertical position.

Each of the legs 15 is provided with a shoulder or collar 18 on the end thereof, and an extension 19 is telescopically or slidably connected to each of the legs 15, there being a set screw 20 extending through the shoulder 18 and engaging the extension 19 for maintaining the extension 19 immobile in its various adjusted positions. Thus, by means of the extensions 19 the legs 15 can be adjusted to any desired elevation so that the table can be readily levelled in the event the legs are sitting on uneven ground.

There is further provided a second pair of spring clips which are indicated by the numeral 21, and the spring clips 21 are adapted to receive the legs 15 when the legs 15 are in their folded position as for example as shown in Figure 1 so that the legs 15 will not accidentally move. However, when it is desired to use the table, the legs 15 can be readily moved out of engagement with the spring clips 21 so that the legs 15 can be moved to the operative or open position shown in Figure 2.

Also secured to the undersurface of the top 11 is a pair of aligned channel members which are each indicated by the numeral 22. Each of the channel members 22 has a substantially U-shape and each includes a top wall 23 which is secured to the undersurface of the top 11 through the medium of suitable securing elements 24, Figure 4. Each channel member 22 further includes a pair of vertically disposed spaced parallel side walls 25 which are provided with inturned opposed tongues or fingers 26. Stop members 27 and 28 are arranged on the ends of the channel member 22 for a purpose to be later described.

Slidably connected to each channel member 22 is a block or plug 29, and the block 29 is provided with a pair of opposed grooves 30 which slidably engage the tongues 26 on the channel member 22.

Extending outwardly from the block 29 is a bolt 31 which has a wing nut 32 arranged in threaded engagement therewith, the bolt 31 extending through a block 33 which is connected to an arm 34. The bolt 31 provides a pivotal connection between the arm 34 and the block 29. The arm 34 has a substantially U-shape, and carried by each arm 34 is a block 35 which has a bolt 36 extending therefrom, there being a nut 37 arranged in engagement with the bolt 36. Adjustably connected to each arm 34 is a link 38, and the link 38 is provided with an elongated slot 39 through which extends the bolt 36, there being a hook 40 on the end of the link 38 whereby the hook 40 can be arranged in engagement with a portion of the vehicle bumper 41, Figure 2. As shown in Figure 2 the portion of the link 38 adjacent the hook 40 may be offset as at 42 so as to permit the hook to be arranged in engagement with the concave type of bumper 41 shown in Figure 2. In Figure 7 there is shown a slightly modified link 38' which is adapted to be used with a bumper 43 that is flat on top and in Figure 7 the offset portion 42 is omitted since it is not needed.

From the foregoing it is apparent that there has been provided a table which can be used for any desired purpose and wherein the table is adapted to be connected to and partially supported by a vehicle bumper such as the automobile bumper 41 or the automobile bumper 43, Figures 2 and 7. When the table is not being used the parts can be folded to the position shown in Figure 1 and with the parts in the position shown in Figure 1 the extensions 19 are moved inwardly into the hollow legs 15. Furthermore, the legs 15 are pivoted about the pins 17 and the legs are retained against the top 11 by means of the spring clips 21. Also, the links 38 are moved inwardly in the arms 34 and the arms 34 are pivoted on the bolts 31 so that the various parts occupy a minimum amount of space. Thus, with the table in folded position it can be readily stored or carried in the trunk of the vehicle or other location without taking up more space or area.

When the table is to be used, it is only necessary to extend the parts from the position shown in Figure 1 to the position shown in Figure 2 and with the parts in the position shown in Figure 2 the hooks 42 are adapted to engage the bumper such as the rear bumper 41 of an automobile, then, the top 11 will be in a horizontal position so that the table can be used for any desired purpose in the same manner as any other table. To move the parts to the position shown in Figure 2, the legs 15 are swung from the position shown in Figure 1 to the position shown in Figure 2 about the pivot pins 17. Then, the spring clips 16 will releasably grip the legs 15 so as to retain or maintain the legs 15 in their vertical position so that the table will not accidentally collapse. Furthermore, the extensions 19 can be adjusted to the desired position and then the bolts 20 can be tightened so as to maintain the extensions 19 immobile in their various adjusted positions. Furthermore, the channel members 22 are stationary and the channel members 22 are secured to the undersurface of the top 11 through the medium of the securing elements 24. However, the blocks 29 are slidably mounted in the channel members 22 so that the arms 34 and links 38 can be moved to different positions. Thus, by loosening the nut 32 on the bolt 31, the block 29 can be moved along the channel member due to the provision of the slots 30 which receive the tongues 26. After the block 29 has been moved to the desired position, the nuts 32 are again tightened so as to retain the blocks 29 immobile in their adjusted positions. The arms 34 can be pivoted outwardly about an axis extending through the bolt 31. Then, the nuts 37 can be loosened due to the provision of the slot 39 in the link 38, the links 38 can be extended outwardly the desired amount until the hooks 42 engage the bumper 41 or the bumper 43. Then, the nuts 37 can be tightened so as to retain the parts in their proper position.

As previously described the arrangement shown in Figure 7 is especially suitable for connecting the table to a bumper 43 which has a flat top. By connecting the table to the bumper, there is provided a convenient support for the table so that the table can be supported by only two legs. The table can be used by persons who are dining out as for example by persons who desire to eat a picnic lunch. The present invention thus provides a collapsible or folding table which hooks onto the bumper of a vehicle on one end and wherein the other end of the table is provided with folding or adjustable legs. The table is completely collapsible and can be easily carried in the trunk of the vehicle or automobile. The table can also be used by other persons such as fishermen, salesmen or pitchmen who sell their wares from the trunk of their car. Due to the provision of the adjustable legs and arms as shown in Figure 4, the table can be adjusted to fit different types of bumpers and the position of the table can be adjusted as desired. Also, since the legs 15 include the adjustable extensions 19, the table can be raised or lowered or levelled as desired as for example when the table is sitting on uneven ground. Furthermore, the table can be quickly opened or closed with a minimum amount of effort.

I claim:

1. In a table, a top, a pair of aligned channel members secured to the undersurface of said top and each channel member including a top wall, a pair of spaced parallel vertically disposed side walls depending from said top wall, opposed tongues extending inwardly from the lower ends of said side walls, a stop member on the ends of said channel members, a block slidably mounted in each of said channel members, said stop members limiting movement of said blocks in said channel members, each of said blocks being provided with opposed slots for slidably receiving said tongues, an arm pivotally connected to each of said blocks, a link telescopically connected to each of said arms, a hook on the outer end of each of said links for engagement with a vehicle bumper, a pair of spaced apart support members secured to the undersurface of said top, a first pair of sprung clips connected to said support members, a leg pivotally connected to each support member, and said legs being mounted for movement into and out of engagement with said spring clips, a second pair of spring clips secured to the undersurface of said top for at times receiving said legs, and an extension slidably connected to each of said legs, and a securing element extending through each leg for engagement with said extension.

2. In a table, a top, a pair of aligned channel members secured to the undersurface of said top and each channel member including a top wall, a pair of spaced parallel vertically disposed side walls depending from said top wall, opposed tongues extending inwardly from the lower ends of said side walls, a stop member on the ends of said channel members, a block slidably mounted in each of said channel members, said stop members limiting movement of said blocks in said channel members, each of said blocks being provided with opposed slots for slidably receiving said tongues, an arm pivotally connected to each of said blocks, a link telescopically connected to each of said arms, a hook on the outer end of each of said links for engagement with a vehicle bumper, a pair of spaced apart support members secured to the undersurface of said top, a first pair of spring clips connected to said support members, a leg pivotally connected to each support member, and said legs being mounted for movement into and out of engagement with said spring clips, a second pair of spring clips secured to the undersurface of said top for at times receiving said legs, an extension slidably connected to each of said legs, a securing element extending through each leg for engagement with said extension, and means for maintaining said links immobile in their adjusted positions in said arms.

3. A table comprising a top, a pair of aligned channel members secured to the undersurface of said top and each channel member embodying a top wall, each of said channel members having a substantially U-shape, a pair of side walls depending from said top wall, opposed tongues extending inwardly from the lower ends of said side walls, a stop member on the ends of said channel members, a block slidably mounted in each channel member, said stop members limiting movement of said blocks in said channel members, each of said blocks having opposed slots for slidably receiving said tongues, an arm pivotally connected to each of said blocks, said arms having a substantially U-shape, a link telescopically connected to each of said arms, a hook on the outer end of each of said links for engagement with a vehicle bumper, a pair of spaced apart support members including flanges which are secured to the undersurface of said top, a first pair of spring clips connected to said support members, a leg pivotally connected to each support member, said legs being mounted for movement into and out of engagement with said spring clips, a second pair of spring clips secured to the undersurface of said top for at times receiving said legs, an extension slidably connected to each of said legs, each of said legs being provided with a shoulder on an end thereof, a securing element extending through the shoulder on each leg for engagement with said extension, and means for maintaining said links immobile in their adjusted positions in said arms, whereby by means of the extension, the legs can be adjusted to any desired elevation so that the table can be readily leveled in the event the legs are sitting on uneven ground.

References Cited in the file of this patent

UNITED STATES PATENTS

| | | |
|---|---|---|
| 1,288,560 | Gordon | Dec. 24, 1918 |
| 1,723,238 | Hoot | Aug. 6, 1929 |
| 2,555,130 | Harles | May 29, 1951 |
| 2,584,557 | Cuthbertson | Feb. 5, 1952 |
| 2,721,777 | Willis | Oct. 25, 1955 |
| 2,726,127 | Mun | Dec. 6, 1955 |